(12) United States Patent
Kumazaki et al.

(10) Patent No.: US 8,939,868 B2
(45) Date of Patent: Jan. 27, 2015

(54) CONTROL DEVICE FOR VEHICLE DRIVE DEVICE

(71) Applicants: Kenta Kumazaki, Toyota (JP); Tooru Matsubara, Toyota (JP); Atsushi Tabata, Okazaki (JP); Tatsuya Imamura, Okazaki (JP)

(72) Inventors: Kenta Kumazaki, Toyota (JP); Tooru Matsubara, Toyota (JP); Atsushi Tabata, Okazaki (JP); Tatsuya Imamura, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/219,514

(22) Filed: Mar. 19, 2014

(65) Prior Publication Data

US 2014/0206500 A1 Jul. 24, 2014

Related U.S. Application Data

(63) Continuation-in-part of application No. PCT/JP2011/072294, filed on Sep. 28, 2011.

(51) Int. Cl.
*B60W 10/02* (2006.01)
*B60W 10/08* (2006.01)
(Continued)

(52) U.S. Cl.
CPC ............... *B60W 10/196* (2013.01); *B60K 6/44* (2013.01); *B60K 6/547* (2013.01); *B60W 10/08* (2013.01); *B60K 6/485* (2013.01); *B60W 10/026* (2013.01); *B60W 20/1062* (2013.01); *B60W 20/40* (2013.01); *Y02T 10/623* (2013.01); *B60W 2520/10* (2013.01); *Y02T 10/6226* (2013.01); *Y10S 903/902* (2013.01)
USPC .............................................. 477/5; 903/902

(58) Field of Classification Search
USPC ........... 477/5, 6, 8, 14, 62, 64, 70, 83, 84, 91, 477/166, 169, 174, 175, 180; 903/912, 914, 903/930, 946
See application file for complete search history.

(56) References Cited

U.S. PATENT DOCUMENTS 7,329,204 B2 * 2/2008 Senda et al. ...................... 477/5
8,506,449 B2 * 8/2013 Yoshida et al. .................. 477/5
(Continued)

FOREIGN PATENT DOCUMENTS

JP   A-2000-118246   4/2000
JP   A-2003-278910   10/2003
(Continued)

OTHER PUBLICATIONS

Oct. 25, 2011 Written Opinion of the International Searching Authority issued in International Patent Application No. PCT/JP2011/072294 (with English Translation).
(Continued)

*Primary Examiner* — Justin Holmes
(74) *Attorney, Agent, or Firm* — Oliff PLC

(57) ABSTRACT

A control device of a vehicle drive device includes: a hydraulic power transmission device having a lockup clutch mechanically coupling an input-side rotating member to which power from an engine is input and an output-side rotating member outputting power to drive wheels; and an electric motor coupled to a power transmission path between the hydraulic power transmission device and the drive wheels. If regeneration braking of a vehicle is performed with the electric motor, an engagement force of the lockup clutch is made larger when a vehicle speed related value varying depending on a vehicle speed is higher.

9 Claims, 10 Drawing Sheets

(51) Int. Cl.
- *B60W 10/196* (2012.01)
- *B60K 6/44* (2007.10)
- *B60K 6/547* (2007.10)
- *B60K 6/485* (2007.10)
- *B60W 20/00* (2006.01)

(56) References Cited

U.S. PATENT DOCUMENTS

| | | | |
|---|---|---|---|
| 8,568,275 B2 * | 10/2013 | Inagaki et al. | 477/162 |
| 2003/0153428 A1 * | 8/2003 | Kitano et al. | 477/5 |
| 2003/0186778 A1 | 10/2003 | Yamamoto et al. | |
| 2006/0108163 A1 | 5/2006 | Kitano et al. | |
| 2009/0294194 A1 | 12/2009 | Kitano et al. | |

FOREIGN PATENT DOCUMENTS

| | | |
|---|---|---|
| JP | A-2006-153041 | 6/2006 |
| JP | A-2007-178000 | 7/2007 |
| JP | A-2007-191018 | 8/2007 |

OTHER PUBLICATIONS

Oct. 25, 2011 International Search Report issued in International Patent Application No. PCT/JP2011/072294.

* cited by examiner

|     | C1 | C2 | B1 | B2 | B3 |
|-----|----|----|----|----|----|
| 1st | O  |    |    | O  |    |
| 2nd | O  |    | O  |    |    |
| 3rd | O  |    |    |    | O  |
| 4th | O  | O  |    |    |    |
| 5th |    | O  |    |    | O  |
| 6th |    | O  | O  |    |    |
| R   |    |    |    | O  | O  |
| N   |    |    |    |    |    |

O ENGAGEMENT

FIG.10

|  |  | REQUESTED REGENERATIVE POWER | | | | |
|---|---|---|---|---|---|---|
|  |  | 1kW | 2kW | 3kW | 4kW | ・・・・・・・・・ |
| SHIFT STAGE: FIRST SPEED | FIRST DETERMINATION VALUE | ・・・km/h | ・・・km/h | ・・・km/h | ・・・km/h | ・・・・・・・・・ |
|  | SECOND DETERMINATION VALUE | ・・・km/h | ・・・km/h | ・・・km/h | ・・・km/h | ・・・・・・・・・ |
| SECOND SPEED | FIRST DETERMINATION VALUE | ・・・km/h | ・・・km/h | ・・・km/h | ・・・km/h | ・・・・・・・・・ |
|  | SECOND DETERMINATION VALUE | ・・・km/h | ・・・km/h | ・・・km/h | ・・・km/h | ・・・・・・・・・ |
| THIRD SPEED | FIRST DETERMINATION VALUE | ・・・km/h | ・・・km/h | ・・・km/h | ・・・km/h | ・・・・・・・・・ |
|  | SECOND DETERMINATION VALUE | ・・・km/h | ・・・km/h | ・・・km/h | ・・・km/h | ・・・・・・・・・ |
| FOURTH SPEED | FIRST DETERMINATION VALUE | ・・・km/h | ・・・km/h | ・・・km/h | ・・・km/h | ・・・・・・・・・ |
|  | SECOND DETERMINATION VALUE | ・・・km/h | ・・・km/h | ・・・km/h | ・・・km/h | ・・・・・・・・・ |
| FIFTH SPEED | FIRST DETERMINATION VALUE | ・・・km/h | ・・・km/h | ・・・km/h | ・・・km/h | ・・・・・・・・・ |
|  | SECOND DETERMINATION VALUE | ・・・km/h | ・・・km/h | ・・・km/h | ・・・km/h | ・・・・・・・・・ |
| SIXTH SPEED | FIRST DETERMINATION VALUE | ・・・km/h | ・・・km/h | ・・・km/h | ・・・km/h | ・・・・・・・・・ |
|  | SECOND DETERMINATION VALUE | ・・・km/h | ・・・km/h | ・・・km/h | ・・・km/h | ・・・・・・・・・ |

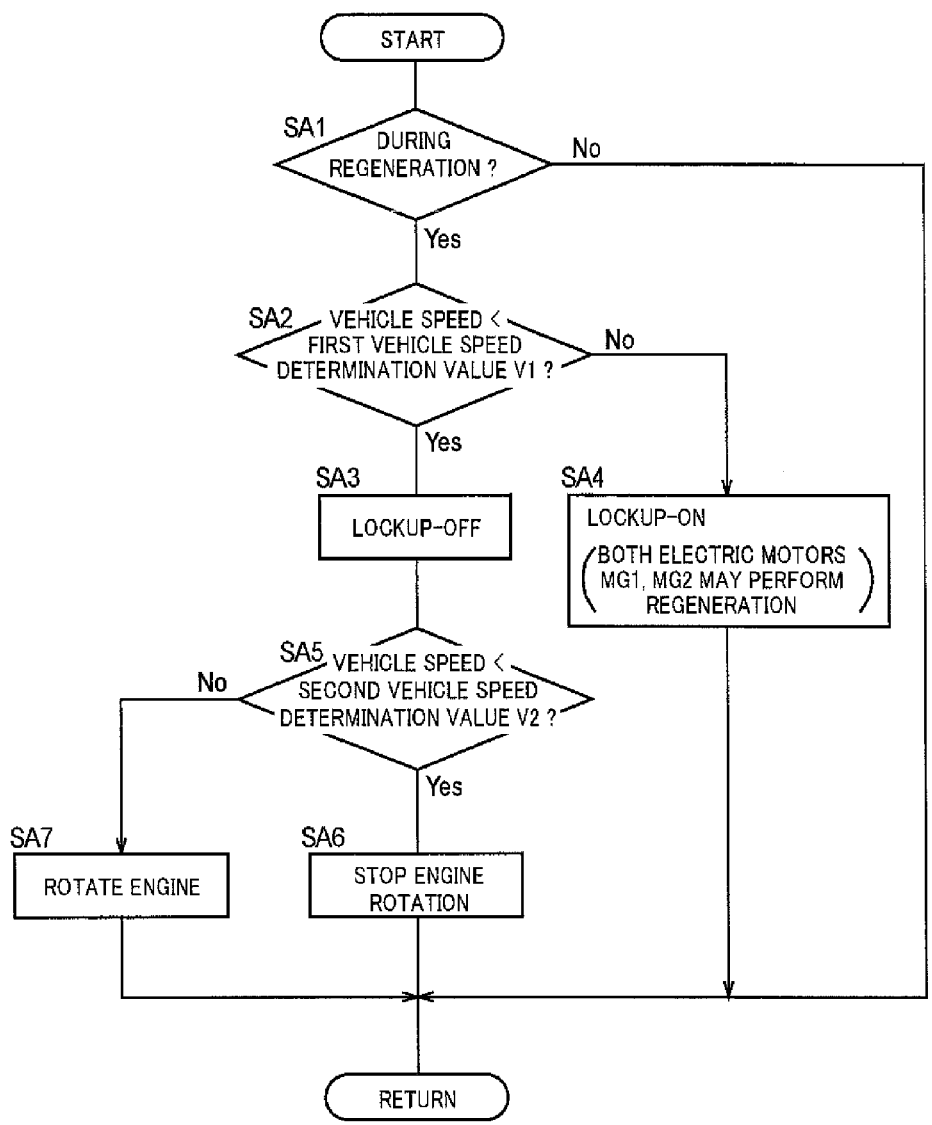

CONTROL DEVICE FOR VEHICLE DRIVE DEVICE

This is a Continuation-in-Part of Application No. PCT/JP2011/072294 filed Sep. 28, 2011. The disclosure of the prior application is hereby incorporated by reference herein in its entirety.

TECHNICAL FIELD

The present invention relates to control during braking of a vehicle in a hybrid vehicle including an engine, an electric motor, and a hydraulic power transmission device.

BACKGROUND ART

A control device of a vehicle drive device is conventionally well known that includes a hydraulic power transmission device having a lockup clutch mechanically coupling an input-side rotating member to which power from an engine is input and an output-side rotating member outputting power to drive wheels, and an electric motor for running coupled to a power transmission path between the hydraulic power transmission device and the drive wheels. For example, this corresponds to a control device of a vehicle drive device described in Patent Document 1. In Patent Document 1, the hydraulic power transmission device is specifically a torque converter. Therefore, the input-side rotating member is a pump impeller of the torque converter and the output-side rotating member is a turbine impeller. During regeneration of the electric motor for running, the control device of Patent Document 1 slips or releases the lockup clutch to make an engine rotation speed lower as compared to during engagement of the lockup clutch. As a result, for example, an engine rotation resistance is reduced and a larger regenerative amount of the electric motor for running can be acquired according to the description of Patent Document 1. The regenerative amount of the electric motor for running is an electric power amount generated through regenerative operation by the electric motor for running.

PRIOR ART DOCUMENTS

Patent Documents

Patent Document 1: Japanese Laid-Open Patent Publication No. 2007-191018
Patent Document 2: Japanese Laid-Open Patent Publication No. 2006-153041
Patent Document 3: Japanese Laid-Open Patent Publication No. 2000-118246

SUMMARY OF THE INVENTION

Problem to be Solved by the Invention

If the engine rotation resistance is reduced, the regenerative amount of the electric motor for running is certainly increased during regeneration of the electric motor for running. The engine rotation resistance is made smaller when the engine rotation speed is lower. However, a factor of increasing a regenerative loss during regeneration of the electric motor for running is not limited to the engine rotation resistance, and a negative torque applied to the output-side rotating member depending on an input/output rotation speed difference and a capacity coefficient of the hydraulic power transmission device is also a factor of increasing the regenerative loss. In other words, a torque loss of the hydraulic power transmission device is a factor of increasing the regenerative loss. Therefore, the cited document 1 includes an unknown problem of insufficient reduction of the regenerative loss since no consideration is given to the torque loss of the hydraulic power transmission device during regeneration of the electric motor for running. The torque loss of the hydraulic power transmission device during regeneration of the electric motor for running has unknown tendency to become significantly larger and increase the regenerative loss at higher vehicle speed as compared to the engine rotation resistance if the lockup clutch is released, for example.

The present invention was conceived in view of the situations and it is therefore an object of the present invention to provide a control device of a vehicle drive device capable of increasing a regenerative amount of an electric motor during regeneration of the electric motor in the vehicle drive device including a hydraulic power transmission device having a lockup clutch and an electric motor coupled to a power transmission path between the hydraulic power transmission device and drive wheels.

Means for Solving the Problem

To achieve the object, the first aspect of the invention provides (a) a control device of a vehicle drive device comprising: a hydraulic power transmission device having a lockup clutch mechanically coupling an input-side rotating member to which power from an engine is input and an output-side rotating member outputting power to drive wheels; and an electric motor coupled to a power transmission path between the hydraulic power transmission device and the drive wheels, wherein (b) if regeneration braking of a vehicle is performed with the electric motor, an engagement force of the lockup clutch is made larger when a vehicle speed related value varying depending on a vehicle speed is higher.

Effects of the Invention

Consequently, during regeneration of the electric motor, when the vehicle speed related value is higher, i.e., when the vehicle speed is higher, the torque loss of the hydraulic power transmission device is considered more important than the rotation resistance of the engine and the input/output rotation speed difference of the hydraulic power transmission device is reduced by the engagement force of the lockup clutch. Therefore, a regenerative loss of the electric motor is reduced with consideration given to both the engine rotation resistance and the torque loss of the hydraulic power transmission device. Thus, the regenerative amount (e.g., in kWh) of the electric motor can be increased during regeneration of the electric motor as compared to the case of keeping the lockup clutch released regardless of the vehicle speed, for example. If the regenerative amount can be increased in this way, the fuel efficiency can consequently be improved. Although a rotation of the engine is normally suppressed during regeneration of the electric motor as apparent from Patent Document 1 described above, the input/output rotation speed difference of the hydraulic power transmission device is made smaller at high vehicle speed in the first aspect of the invention and, therefore, the rotation of the engine is promoted. The first aspect of the invention is considered innovative as compared to conventional techniques such as Patent Document 1 in that the rotation of the engine is promoted at higher vehicle speed so as to achieve an increase in the regenerative amount of the electric motor. The fuel efficiency refers to, for example, a running distance per unit fuel consumption etc., and improvement in the fuel efficiency refers to extension of the running distance per unit fuel consumption, or a decrease in fuel consumption rate (=fuel consumption/drive wheel output) of the vehicle as a whole. Contrarily, reduction (deterioration) in the fuel efficiency refers to shortening of the miming distance per unit fuel consumption or an increase in the fuel consumption rate of the vehicle as a whole.

The second aspect of the invention provides the control device of a vehicle drive device recited in the first aspect of the invention, wherein if the regeneration braking of the vehicle is performed, a rotation speed of the input-side rotating member of the hydraulic power transmission device is brought closer to a rotation speed of the output-side rotating member when the vehicle speed related value is higher. Consequently, the regenerative loss of the electric motor is reduced with consideration given to both the engine rotation resistance and the torque loss of the hydraulic power transmission device in the same way as the first aspect of the invention and, thus, the regenerative amount of the electric motor can be increased during regeneration of the electric motor as compared to the case that the engine is dragged and passively rotated by the rotation of the output-side rotating member regardless of the vehicle speed, for example.

The third aspect of the invention provides the control device of a vehicle drive device recited in the first or second aspect of the invention, wherein (a) an engine-coupled electric motor is disposed that is coupled to a power transmission path between the engine and the hydraulic power transmission device, wherein the engine-coupled electric motor is configured to be regeneratively operated along with the electric motor, and wherein (b) during release of the lockup clutch when the regeneration braking of the vehicle is performed, a rotation speed of the engine is made lower by the engine-coupled electric motor when the vehicle speed related value is lower. Consequently, during regeneration of the electric motor, when the vehicle speed is lower, the rotation resistance of the engine is considered more important than the torque loss of the hydraulic power transmission device and the rotation speed of the engine is reduced. Therefore, in the lower vehicle speed range in which the regenerative loss of the electric motor cannot be reduced by the engagement force of the lockup clutch, the regenerative loss of the electric motor is reduced with consideration given to both the rotation resistance of the engine and the torque loss of the hydraulic power transmission device. Thus, the regenerative amount of the electric motor can be increased during regeneration of the electric motor as compared to the case that the engine is dragged and passively rotated by the rotation of the output-side rotating member of the hydraulic power transmission device regardless of the vehicle speed, for example.

The fourth aspect of the invention provides the control device of a vehicle drive device recited in the third aspect of the invention, wherein if the regeneration braking of the vehicle is performed, the lockup clutch is engaged when the vehicle speed is equal to or greater than a first vehicle speed determination value, wherein the lockup clutch is released or slipped when the vehicle speed is less than the first vehicle speed determination value, and wherein rotation of the engine is stopped by the engine-coupled electric motor when the vehicle speed is less than a second vehicle speed determination value lower than the first vehicle speed determination value. Consequently, by using the first vehicle speed determination value and the second vehicle speed determination value, the regenerative loss of the electric motor is reduced through simple control with consideration given to both the rotation resistance of the engine and the torque loss of the hydraulic power transmission device. Therefore, a control load of the control device can be alleviated.

The fifth aspect of the invention provides the control device of a vehicle drive device recited in the fourth aspect of the invention, wherein the first vehicle speed determination value and the second vehicle speed determination value are preliminarily defined to minimize a braking torque applied from the input-side rotating member to the output-side rotating member depending on a rotation speed difference between the input-side rotating member and the output-side rotating member and a rotation resistance of the engine when the regeneration braking of the vehicle is performed. Consequently, a sufficiently larger regenerative amount of the electric motor can be acquired in a wide vehicle speed range with consideration given to both the rotation resistance of the engine and the torque loss of the hydraulic power transmission device.

The sixth aspect of the invention provides the control device of a vehicle drive device recited in any one of the third to fifth aspects of the invention, wherein during engagement of the lockup clutch when the regeneration braking of the vehicle is performed, both the electric motor and the engine-coupled electric motor are regeneratively operated. Consequently, since the torque during regeneration is distributed to the electric motor and the engine-coupled electric motor, an overall copper loss of the electric motors involved with the regeneration is reduced as compared to when only the electric motor is regeneratively operated. Therefore, regenerative efficiency is improved. The copper loss of the electric motors is in proportion to the square of the torque of the electric motors. The regenerative efficiency is a rate of a regenerative power (e.g., in kW) generated based on a braking power (e.g., in kW) transmitted from the drive wheels to the output-side rotating member of the hydraulic power transmission device during the regeneration braking of the vehicle, relative to the braking power.

The seventh aspect of the invention provides the control device of a vehicle drive device recited in the fourth or fifth aspect of the invention, wherein (a) a mechanical transmission is disposed that makes up a portion of a power transmission path between the electric motor and the drive wheels, and wherein (b) the first vehicle speed determination value and the second vehicle speed determination value are defined based on a shift stage of the mechanical transmission selected when the regeneration braking of the vehicle is performed. Consequently, the first vehicle speed determination value and the second vehicle speed determination value can be determined suitably for each shift stage of the mechanical transmission with consideration given to the case that the mechanical transmission is shifted.

The eighth aspect of the invention provides the control device of a vehicle drive device recited in the seventh aspect of the invention, wherein the shift stage of the mechanical transmission is selected such that a regenerative efficiency of the electric motor becomes higher and that the rotation speed of the engine becomes higher, when the regeneration braking of the vehicle is performed. Consequently, since the higher rotation speed of the engine results in better re-acceleration performance when an acceleration operation is performed during the regenerative braking of the vehicle, the favorable re-acceleration performance can easily be acquired while the regenerative efficiency of the electric motor is made higher.

The ninth aspect of the invention provides the control device of a vehicle drive device recited in any one of the third to eighth aspects of the invention, wherein during release of the lockup clutch when the regeneration braking of the vehicle is performed, the rotation speed of the engine is controlled by the engine-coupled electric motor such that the regenerative efficiency of the electric motor becomes higher. Consequently, during release of the lockup clutch, the regenerative amount of the electric motor can actively be increased as compared to the case that the engine is dragged and passively rotated by the rotation of the output-side rotating member of the hydraulic power transmission device, for example.

The tenth aspect of the invention provides the control device of a vehicle drive device recited in any one of the first to ninth aspects of the invention, wherein the vehicle speed related value is a vehicle speed or a rotation speed of the output-side rotating member. Consequently, since both the vehicle speed and the rotation speed of the output-side rotating member can easily be detected by a sensor etc., the vehicle speed related value can be easily acquired.

Preferably, if the regenerative braking of the vehicle is performed through the electric motor, the engine is put into the non-operating state.

BRIEF DESCRIPTION OF THE DRAWINGS

FIG. 10 is an example of a vehicle speed determination value map, which indicates the first vehicle speed determination value and the second vehicle speed determination value used during regenerative braking of the hybrid vehicle in FIG. 1 depending on the requested regenerative power for each shift stage of the automatic transmission.

FIG. 11 is a flowchart of the first example for explaining a main portion of a control operation of the electronic control device of FIG. 9, i.e., a control operation of providing the regeneration-time lockup control and the regeneration-time engine rotation suppression control depending on the vehicle speed when the regenerative braking of the vehicle is performed.

MODE FOR CARRYING OUT THE INVENTION

An example of the present invention will now be described in detail with reference to the drawings.

First Example

Figure 1:
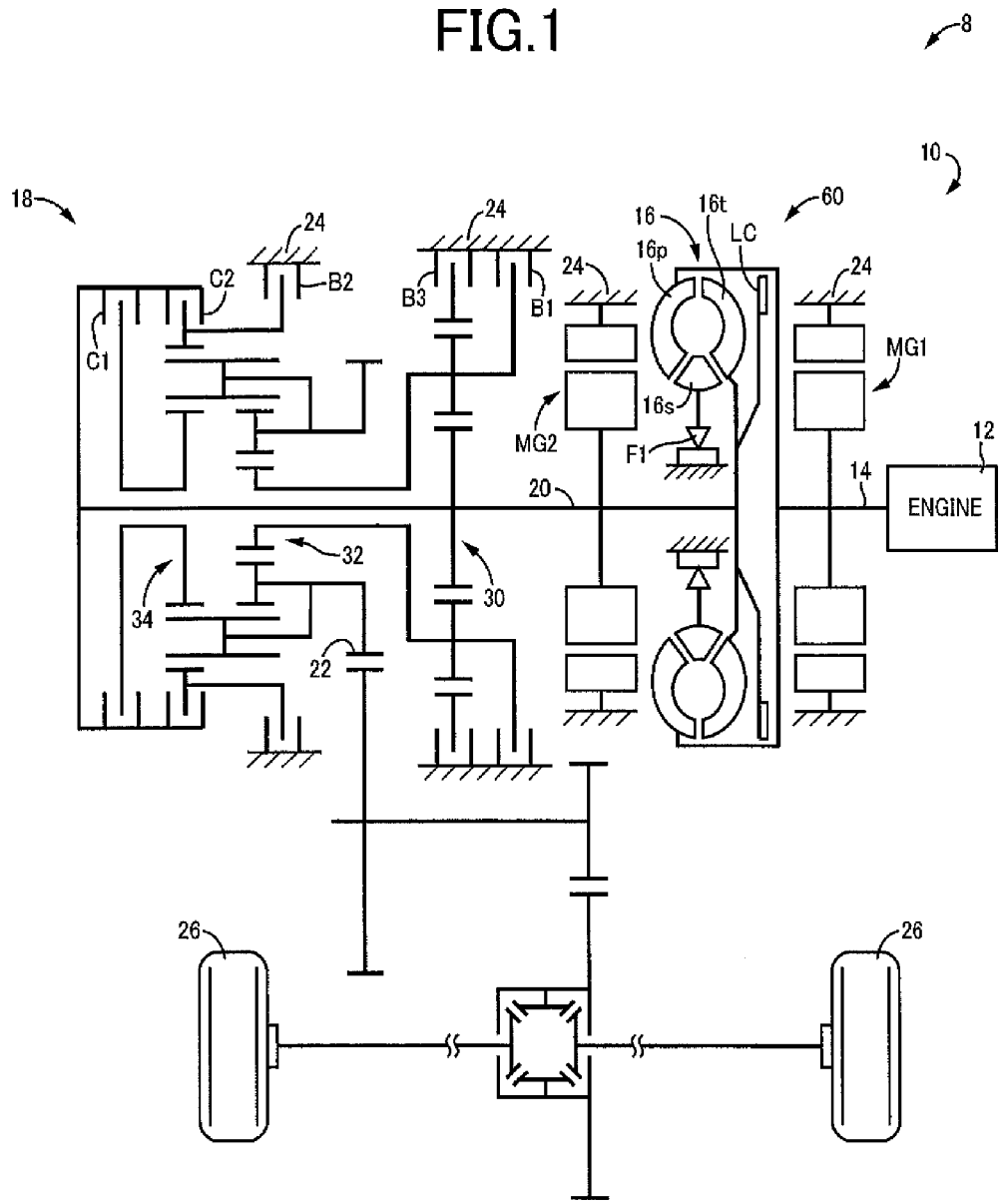
FIG. 1 is a schematic for explaining a configuration of a vehicle drive device included in a hybrid vehicle that is an example of the present invention.

FIG. 1 is a schematic for explaining a configuration of a vehicle drive device 10 included in a hybrid vehicle 8 (hereinafter referred to as a vehicle 8) that is an example of the present invention. In FIG. 1, the vehicle drive device 10 is preferably employed in an FF (front-engine front-drive) type vehicle and includes an engine 12 that is a generally known internal combustion engine such as a gasoline engine and a diesel engine, a torque converter (a hydraulic power transmission device) 16 coupled to a crankshaft 14 of the engine 12, an automatic transmission 18 disposed between the torque converter 16 and drive wheels 26 and coupled to an output side of the torque converter 16, a first electric motor MG1 disposed between the engine 12 and the torque converter 16 and coupled to the crankshaft 14, and a second electric motor MG2 disposed between the torque converter 16 and the automatic transmission 18 and coupled to an input shaft 20 of the automatic transmission 18.

The torque converter 16 is a hydraulic power transmission device including a pump impeller 16$p$ acting as an input-side rotating member to which power from the engine 12 is input, a turbine impeller 16$t$ acting as an output-side rotating member outputting power to the drive wheels 26, a stator impeller 16$s$, and a unidirectional clutch F1. The pump impeller 16$p$, i.e., a pump impeller, is coupled to the crankshaft 14 of the engine 12 and the first electric motor MG1 and is rotationally driven by the engine 12 to generate a fluid flow due to a flow of operating oil in the torque converter 16. The turbine impeller 16$t$, i.e., a turbine runner, is coupled to the input shaft 20 of the automatic transmission 18 and rotated in response to the fluid flow from the pump impeller 16$p$. The stator impeller 16$s$ is disposed in the fluid flow from the pump impeller 16$p$ to the turbine impeller 16$t$ and supported by the unidirectional clutch F1 rotatably in a positive rotation direction of the crankshaft 14 (a rotation direction of the crankshaft 14 during an operation of the engine 12) and non-rotatably in a negative rotation direction. The input shaft 20 of the automatic transmission 18 also acts as an output shaft, i.e., a turbine shaft, of the torque converter 16. As can be seen from FIG. 1, since the engine 12, the first electric motor MG1, and the pump impeller 16$p$ are coupled in series in this example, a rotation speed Np of the pump impeller 16$p$ (hereinafter referred to as a pump rotation speed Np) is the same as a rotation speed Nmg1 of the first electric motor MG1 (hereinafter referred to as a first electric motor rotation speed Nmg1) and an engine rotation speed Ne. Since the turbine impeller 16$t$, the second electric motor MG2, and the input shaft 20 of the automatic transmission 18 are coupled in series, a rotation speed Nt of the turbine impeller 16$t$ (hereinafter referred to as a turbine rotation speed Nt) is the same as a rotation speed Nmg2 of the second electric motor MG2 (hereinafter referred to as a second electric motor rotation speed Nmg2) and a rotation speed Natin of the input shaft 20 (hereinafter referred to as a transmission input rotation speed Natin).

The torque converter 16 includes a lockup clutch LC selectively coupling the pump impeller 16$p$ and the turbine impeller 16$t$. The lockup clutch LC is actuated by an oil pressure from a hydraulic control circuit 42 (see FIG. 9) and controlled to be in one of a completely engaged state (hereinafter simply referred to as an "engaged state"), a slipping state, and a released state. When the lockup clutch LC is put into the released state, torque is transmitted between the crankshaft 14 and the input shaft 20 via the operating oil in the torque converter 16 as described above. When the lockup clutch LC is put into the engaged state, the lockup clutch LC mechanically directly couples the pump impeller 16$p$ and the turbine impeller 16$t$ and, therefore, the crankshaft 14 of the engine 12 and the input shaft 20 of the automatic transmission 18 are integrally coupled to each other and the torque is directly transmitted between the crankshaft 14 and the input shaft 20 without an intervention of the operating oil in the torque converter 16.

The first electric motor MG1 is coupled to the crankshaft 14 of the engine 12 in series via a damper etc., absorbing pulsation, for example, and is directly coupled to the pump impeller 16$p$ of the torque converter 16. In short, the first electric motor MG1 is coupled to a power transmission path between the engine 12 and the torque converter 16. The second electric motor MG2 acts as an electric motor for running and is coupled to a power transmission path between the torque converter 16 and the drive wheels 26 and, in particular, coupled to the drive wheels 26 indirectly via the automatic transmission 18 etc. The first electric motor MG1 and the second electric motor MG2 are rotating machines configured to selectively achieve a function as an electric motor generating a drive torque and a function as an electric generator generating a regenerative torque and are made up of AC synchronous motor generators, for example. An electric storage device 36 acting as a battery and an inverter 38 for controlling the electric motors MG1 and MG2 are disposed in the vehicle drive device 10 (see FIG. 9), and the electric storage device 36, the first electric motor MG1, and the second electric motor MG2 are connected such that electric power can mutually be given/received. The first electric motor MG1 and the second electric motor MG2 can apply a drive torque in the positive rotation direction to the crankshaft 14 and the input shaft 20, respectively, through the drive thereof. The first electric motor MG1 and the second electric motor MG2 can apply a load torque, i.e., a braking torque, in the negative rotation direction to the crankshaft 14 and the input shaft 20, respectively, through electric generation (regeneration) thereof while charging the electric storage device 36 disposed in the vehicle 8 via the inverter 38. Therefore, the first electric motor MG1 and the second electric motor MG2 can regeneratively be operated independently from each other or at the same time. The first electric motor MG1 corresponds to an engine-coupled electric motor of the present invention and the second electric motor MG2 corresponds to an electric motor of the present invention. The positive rotation direction of the crankshaft 14 and the input shaft 20 is the rotation direction of the crankshaft 14 during drive of the engine 12 and the negative rotation direction is a rotation direction opposite to the positive rotation direction.

Figures 2, 3:
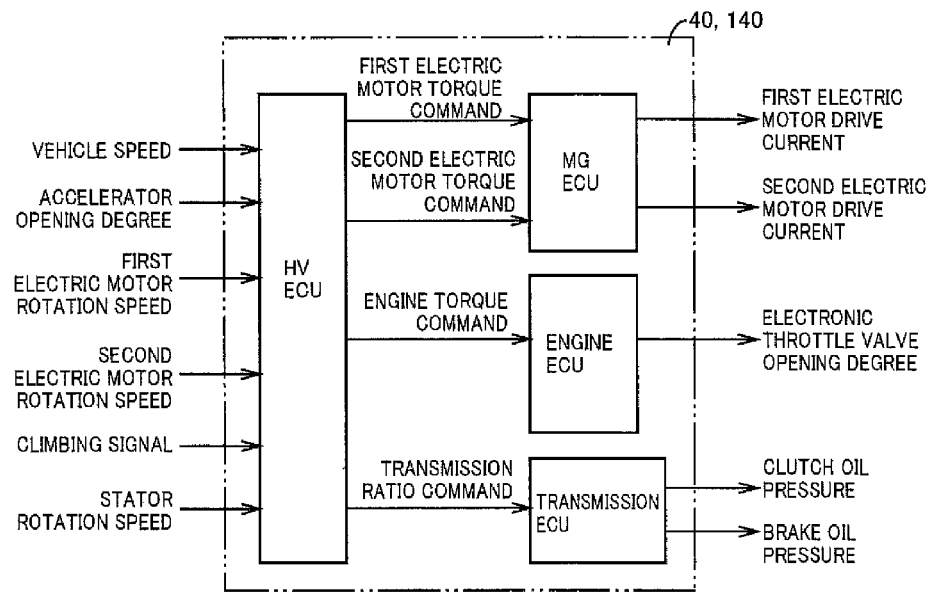
FIG. 2 is an operation table of hydraulic friction engagement devices for establishing shift stages in the automatic transmission depicted in FIG. 1.
FIG. 3 is a diagram for explaining a general configuration of the electronic control device that is a control device for controlling the vehicle drive device of FIG. 1 and input/output signals for the electronic control device.

The automatic transmission 18 is interposed between the torque converter 16 and the drive wheels 26 and is a mechanical transmission making up a portion of a power transmission path between the second electric motor MG2 and the drive wheels 26. Specifically, the automatic transmission 18 is a known planetary-gear type multistage transmission including a first planetary gear device 30, a second planetary gear device 32, a third planetary gear device 34, and a plurality of friction engagement devices C1, C2, B1, B2, and B3 in a transmission case 24 acting as a non-rotating member. The automatic transmission 18 outputs the power of the engine 12 input to the input shaft 20 acting as an input rotating member, from an output gear 22 acting as an output rotating member toward the drive wheels 26. In the automatic transmission 18, known hydraulic friction engagement devices (clutches C1, C2, brakes B1, B2, and B3) are respectively engaged or released by the oil pressure from the hydraulic control circuit 42 (see FIG. 9) in accordance with a predefined operation table depicted in FIG. 2 to establish a plurality of shift stages having respective different gear ratios $\gamma_{AT}$ (=transmission input rotation speed Natin/rotation speed Nout of the output gear 22) of the automatic transmission 18 in an alternative manner. In FIG. 2, "○" indicates an engaged state and a blank indicates a released state. An automatic shift control of the automatic transmission 18 is provided in accordance with a known relationship (shift diagram, shift map) having preliminarily stored upshift and downshift lines.

The vehicle drive device 10 configured as described above switches and actuates an engine running causing the vehicle 8 to run with the power of the engine 12 and a motor running causing the vehicle 8 to run with the power of the second electric motor MG2, depending on a running state of the vehicle 8. The switching between the engine running and the motor running is performed based on which of an engine running range and a motor running range set in the same two-dimensional coordinates as the shift diagram a running state of the vehicle belongs to.

In the vehicle drive device 10, for example, even when the vehicle running state belongs to the motor running range, if a charge remaining amount SOC (state of charge) of the electric storage device 36 is equal to or less than a predetermined value, the engine running is performed. When the vehicle 8 is suddenly started or rapidly accelerated, a control is provided as needed such as using output of both the engine 12 and the second electric motor MG2 for running the vehicle 8.

For example, if a brake pedal is depressed in the vehicle 8 during vehicle running, the vehicle 8 is braked with a braking force corresponding to a depressing force of the brake pedal and, in particular, an electronic control device 40 regeneratively operates the second electric motor MG2 for regenerative braking of the vehicle 8 so as to improve fuel efficiency. The electronic control device 40 puts the engine 12 into a non-operating state at the same time. The non-operating state of the engine 12 is a state in which fuel supply to the engine 12 is interrupted to stop ignition of the engine, regardless of whether the crankshaft 14 has stopped rotating. For example, if the regeneration braking is performed, the electronic control device 40 calculates and determines a requested braking power (e.g., in kW) requested by a driver, based on a vehicle speed V and a depressing force or a depressing amount of the brake pedal from a relationship empirically defined in advance such that a braking force is exerted in accordance with a driver's intention. For example, the requested braking power becomes larger when the depressing force or the depressing amount of the brake pedal is larger or when the vehicle speed V is higher. The electronic control device 40 sets the determined requested braking power as a requested regenerative power (e.g., in kW) requested by the driver in the regenerative braking and regeneratively operates the second electric motor MG2 such that the braking power applied from the output gear 22 to the drive wheels 26 matches the requested regenerative power. However, the requested regenerative power has an upper limitation value set due to a charge limitation to the electric storage device 36 and, if the requested braking power exceeds the upper limitation value of the requested regenerative power, the electronic control device 40 sets the requested regenerative power to the upper limitation value and regeneratively operates the second electric motor MG2. A wheel brake device disposed on each wheel is also operated to compensate for a shortage of the requested regenerative power relative to the requested braking power. The requested braking power is a target value of braking power exerted by the whole vehicle 8 and therefore may be referred to as a target braking power, and the requested regenerative power is a target value of regenerative power exerted in the regenerative braking and therefore may be referred to as a target regenerative power.

FIG. 3 is a diagram for explaining a general configuration of the electronic control device 40 that is a control device for controlling the vehicle drive device 10 and input/output signals for the electronic control device 40. In FIG. 3, the electronic control device 40 includes a so-called microcomputer equipped with a CPU, a RAM, a ROM, and an input/output interface, and the CPU executes signal processes in accordance with programs stored in advance in the ROM, while utilizing a temporary storage function of the RAM, to provide an output control of the engine 12, a shift control of the automatic transmission 18, and an output control of the electric motors MG1 and MG2. Specifically, the electronic control device 40 includes a plurality of ECUs coordinated with each other, i.e., an HVECU controlling the overall running of the vehicle 8, an MGECU providing a drive control of the first electric motor MG1 and the second electric motor MG2, an engine ECU providing a drive control of the engine 12, and a transmission ECU providing the shift control of the automatic transmission 18. As depicted in FIG. 3, the electronic control device 40 is supplied with various input signals indicative of the vehicle speed V, an acceleration opening degree $A_{CC}$, the first electric motor rotation speed Nmg1, the second electric motor rotation speed Nmg2, a climbing signal, a rotation speed of the stator impeller 16s, the depressing force or the depressing amount of the brake pedal, the charge remaining amount SOC of the electric storage device 36, etc., from sensors disposed on the vehicle 8. The electronic control device 40 supplies devices with various output signals indicative of a drive current of the first electric motor MG1, a drive current of the second electric motor MG2, an opening degree θth of an electronic throttle valve of the engine 12 (hereinafter referred to as a throttle valve opening degree θth), clutch oil pressures for engaging the clutches C1 and C2 included in the automatic transmission 18, brake oil pressures for engaging the brakes B1, B2, and B3 included in the automatic transmission 18, etc.

Figure 4:
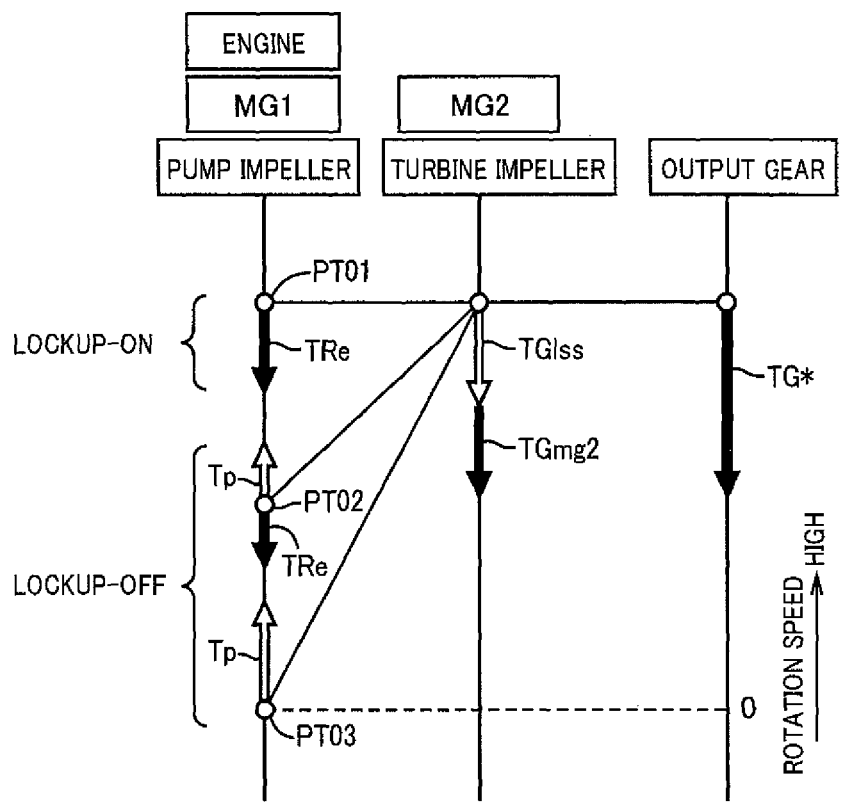
FIG. 4 is a collinear diagram of the pump rotation speed, the turbine rotation speed, and the rotation speed of the output gear from left during regenerative braking of the hybrid vehicle of FIG. 1 for explaining magnitudes of respective torques applied to the pump impeller and the turbine impeller of the torque converter.

FIG. 4 is a collinear diagram of the pump rotation speed Np, the turbine rotation speed Nt, and the rotation speed Nout of the output gear 22 from left during regenerative braking of the vehicle 8 for explaining magnitudes of respective torques applied to the pump impeller 16p and the turbine impeller 16t. In FIG. 4, a gear ratio $\gamma_{AT}$ of the automatic transmission 18 is considered as one for simplicity of description. As depicted in FIG. 4, during regenerative braking of the vehicle 8, a second electric motor regenerative torque TGmg2 is generated around a rotation axis of the turbine impeller 16t by a regenerative operation of the second electric motor MG2 and a regeneration-time loss torque TGlss is generated and applied from the pump impeller 16p to the turbine impeller 16t. The regenerative operation of the second electric motor MG2 is performed such that a sum of the second electric motor regenerative torque TGmg2 and the regeneration-time loss torque TGlss matches a requested regenerative torque TG* corresponding to the requested regenerative power. For each of the second electric motor regenerative torque TGmg2, the regeneration-time loss torque TGlss, and the requested regenerative torque TG*, the positive direction is a direction indicated by arrows of FIG. 4, i.e., a direction of reducing a rotation of the turbine impeller 16t. As can be seen from FIG. 4, to acquire a more regenerative amount (e.g., in kW) of the second electric motor MG2, i.e., a more electric power amount generated through the regenerative operation by the second electric motor MG2, the second electric motor regenerative torque TGmg2 must be increased or, in other words, the regeneration-time loss torque TGlss must be reduced. Factors of generating the regeneration-time loss torque TGlss include a rotation resistance of the engine 12, and a torque loss of the torque converter 16 due to a rotation speed difference (=Nt−Np) between the pump impeller 16p and the turbine impeller 16t. The torque loss of the torque converter 16 becomes larger if a pump torque Tp is larger when the turbine impeller 16t attempts to rotate the pump impeller 16p via the operating oil in the torque converter 16.

In FIG. 4, points PT01, PT02, and PT03 are used for representing a magnitude relation between a friction torque TRe indicative of the rotation resistance of the engine 12 and the pump torque Tp. The point PT01 indicates the pump rotation speed Np (=Ne) at the time of lockup-on, i.e., when the lockup clutch LC is engaged, and since the engine rotation speed Ne is the highest among the points PT01, PT02, and PT03, the friction torque TRe is the largest. On the other hand, since the rotation speed difference is zero between the pump impeller 16p and the turbine impeller 16t, the pump torque Tp is zero at the point PT01. The point PT03 indicates the pump rotation speed Np at the time of lockup-off; i.e., when the lockup clutch LC is released, with the rotation of the crankshaft 14 prevented, and since the engine 12 is not rotating, the friction torque TRe is zero. On the other hand, since the rotation speed difference (=Nt−Np) between the pump impeller 16p and the turbine impeller 16t is the largest among the points PT01, PT02, and PT03, the pump torque Tp is the largest. The point PT02 indicates the pump rotation speed Np at the time of the lockup-off when the engine 12 is dragged and rotated by the rotation of the turbine impeller 16t and, at the point PT02, both the friction torque TRe and the pump torque Tp are greater than zero and the friction torque TRe is smaller than that of the point PT01 while the pump torque Tp is smaller than that of the point PT03. As described above, during the regenerative braking of the vehicle 8, the magnitudes of the friction torque TRe and the pump torque Tp causing an occurrence of the regeneration-time loss torque TGlss are varied depending on whether the lockup clutch LC is engaged or whether the rotation of the engine 12 is prevented at the time of the lockup-off.

Figure 5:
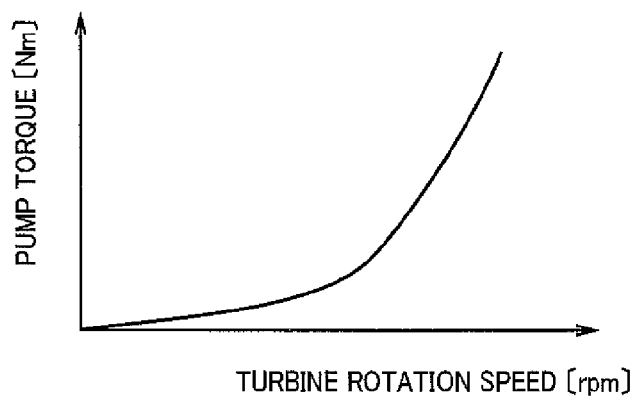
FIG. 5 is a diagram of a relationship between the pump torque and the turbine rotation speed during inverse driving of the torque converter when power is transmitted from the turbine impeller to the pump impeller at the time of the lockup-off of the hybrid vehicle in FIG. 1.
Figure 6:
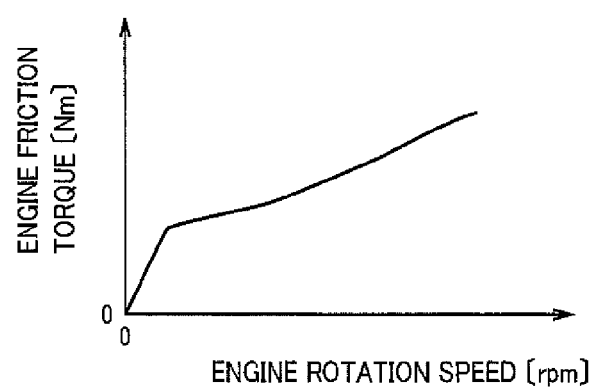
FIG. 6 is a diagram of a relationship between the friction torque and the engine rotation speed in the non-operating state of the engine in the vehicle drive device of FIG. 1.
Figure 7:
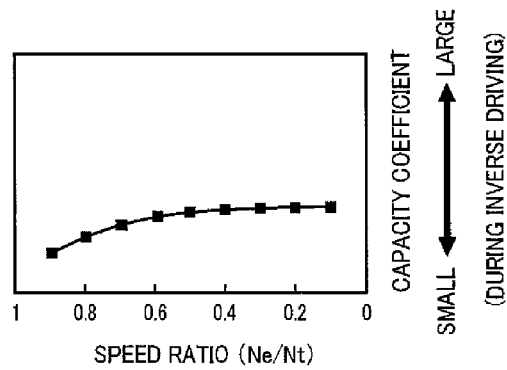
FIG. 7 is a diagram of a relationship between a speed ratio (=Ne/Nt=Np/Nt) during inverse driving of the torque converter and a capacity coefficient of the torque converter in the vehicle drive device of FIG. 1.

As described with reference to FIG. 4, the regeneration-time loss torque TGlss must be reduced for acquiring a more regenerative amount of the second electric motor MG2 during the regenerative braking of the vehicle 8 and the regeneration-time loss torque TGlss is related to the pump torque Tp and the friction torque TRe of the engine 12. FIG. 5 is a diagram of a relationship between the pump torque Tp and the turbine rotation speed Nt during inverse driving of the torque converter 16 when power is transmitted from the turbine impeller 16t to the pump impeller 16p at the time of the lockup-off. FIG. 6 is a diagram of a relationship between the friction torque TRe and the engine rotation speed Ne in the non-operating state of the engine 12. FIG. 7 is a diagram of a relationship between a speed ratio (=Ne/Nt=Np/Nt) during inverse driving of the torque converter 16 and a capacity coefficient τ of the torque converter 16. Since the stator impeller 16s is in an idle state during inverse driving of the torque converter 16, a torque ratio of the torque converter 16 is one.

As depicted in FIG. 5, the pump torque Tp during inverse driving of the torque converter 16 exponentially rises as the turbine rotation speed Nt becomes higher. This is because if a slip occurs in the torque converter 16 during inverse driving of the torque converter 16, when the speed ratio of the torque converter 16 is at a certain small level, the capacity coefficient τ is not so changed relative to the speed ratio as depicted in FIG. 7 and a relational expression "Tp=τ×Nt$^2$" is satisfied between the pump torque Tp and the turbine rotation speed Nt.

On the other hand, as depicted in FIG. 6, the friction torque TRe of the engine 12 linearly increases in a higher rotation speed range relative to the engine rotation speed Ne as the engine rotation speed Ne becomes higher. Therefore, when the engine rotation speed Ne becomes higher in accordance with the vehicle speed V during the regenerative braking of the vehicle 8 with lockup-off, the friction torque TRe does not so increase in a higher vehicle speed range and does not so decrease in a lower vehicle speed range as compared to the pump torque Tp depicted in FIG. 5.

As can be seen from comparison between FIGS. 6 and 7, when the vehicle speed V is higher during the regenerative braking of the vehicle 8, an effect of the pump torque Tp on the regeneration-time loss torque TGlss becomes larger than an effect of the friction torque TRe on the regeneration-time loss torque TGlss. Therefore, to acquire a more regenerative amount of the second electric motor MG2, when the vehicle speed V is higher, reducing the pump torque Tp becomes more important than reducing the friction torque TRe. For example, to acquire a more regenerative amount of the second electric motor MG2 during the regenerative braking of the vehicle 8, the lockup-on is more advantageous than the lockup-off in the case of the higher vehicle speed range because the pump torque Tp is zero although the friction torque TRe becomes larger. Conversely, in the case of the lower vehicle speed range, the lockup-off is more advantageous than the lockup-on. In the case of a further lower vehicle speed range, it is more advantageous to achieve the lockup-off and actively prevent the rotation of the engine 12 than allowing the engine 12 to be dragged and rotated by the turbine impeller 16t.

Figure 8:
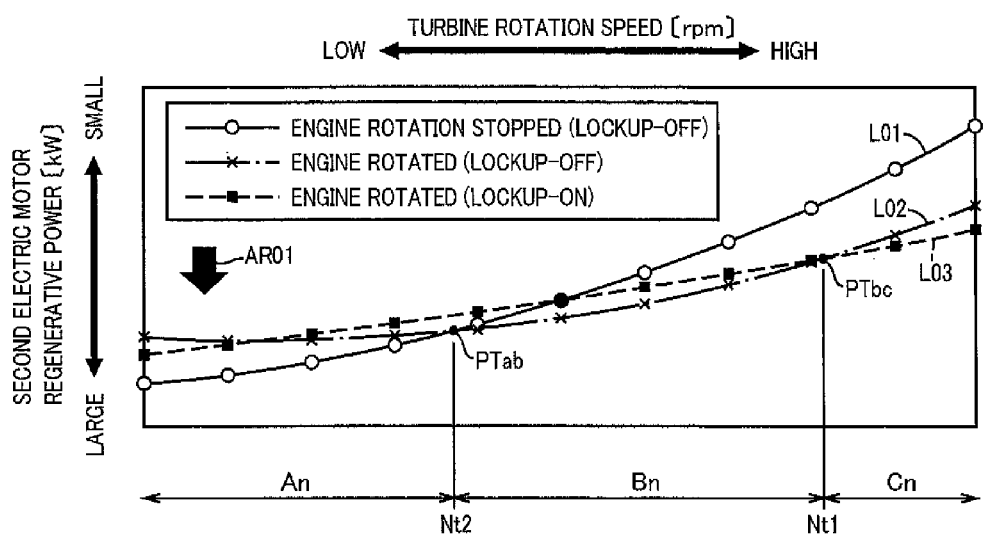
FIG. 8 is a diagram of a relationship between a second electric motor regenerative power generated by the second electric motor and the turbine rotation speed during regenerative braking of the hybrid vehicle in FIG. 1.

FIG. 8 is a diagram of a relationship between a second electric motor regenerative power PGmg2 (e.g., in kW) generated by the second electric motor MG2 and the turbine rotation speed Nt during regenerative braking of the vehicle 8. The second electric motor regenerative power PGmg2 corresponds to the second electric motor regenerative torque TGmg2 depicted in FIG. 4. In FIG. 8, the second electric motor regenerative power PGmg2 increases toward the lower side of FIG. 8 and, therefore, a direction of an arrow AR01 indicates that the regenerative amount of the second electric motor MG2 is larger, i.e., favorable regeneration is performed. In the relationship between the second electric motor regenerative power PGmg2 and the turbine rotation speed Nt of FIG. 8, a solid line L01 represents the case that the engine rotation speed Ne is actively set to zero with the lockup-off; a dashed-dotted line L02 represents the case that the engine 12 is dragged and passively rotated by the turbine impeller 16t with the lockup-off; and a broken line L03 represents the case of the lockup-on. FIG. 8 is on the assumption that the requested regenerative power is a constant predetermined value. A point PTab of FIG. 8 is an intersection between the solid line L01 and the dashed-dotted line L02 and a point PTbc is an intersection between the dashed-dotted line L02 and the broken line L03.

As can be seen from FIG. 8, among the three cases represented by the solid line L01, the dashed-dotted line L02, and the broken line L03, the second electric motor regenerative power PGmg2 becomes largest when the engine rotation speed Ne is actively set to zero with the lockup-off (corresponding to the solid line 01) in a first turbine rotation speed range An lower than a turbine rotation speed Nt2 indicated by the point PTab. In a second turbine rotation speed range Bn between the turbine rotation speed Nt2 indicated by the point PTab and a turbine rotation speed Nt1 indicated by the point PTbc, the second electric motor regenerative power PGmg2 becomes largest when the engine 12 is dragged and passively rotated by the turbine impeller 16t with the lockup-off (corresponding to the dashed-dotted line L02). In a third turbine rotation speed range Cn higher than the turbine rotation speed Nt1 indicated by the point PTbc, the second electric motor regenerative power PGmg2 is maximized in the case of the lockup-on (corresponding to the broken line L03). Therefore, it can be said from FIG. 8 that, to acquire a more regenerative amount of the second electric motor MG2 during the regenerative braking of the vehicle 8, the engine rotation speed Ne may actively be set to zero with the lockup-off if the turbine rotation speed Nt during the regenerative braking is within the first turbine rotation speed range An, that the engine 12 may be allowed to rotate with the lockup-off in the case of the second turbine rotation speed range Bn, and that the lockup-on may be achieved in the case of the third turbine rotation speed range Cn.

As described above, the relationship represented by the solid line L01, the dashed-dotted line L02, and the broken line L03 in FIG. 8 is consistent with the fact derived from the FIGS. 6 and 7, i.e., the fact that the lockup-on is more advantageous than the lockup-off in the case of the higher vehicle speed range while the lockup-off is more advantageous than the lockup-on in the case of the lower vehicle speed range so as to acquire a more regenerative amount of the second electric motor MG2 during the regenerative braking of the vehicle 8.

In this example, based on the relationship between the second electric motor regenerative power PGmg2 and the turbine rotation speed Nt depicted in FIG. 8, the lockup clutch LC is controlled or the engine rotation during the lockup-off is controlled so as to acquire a regenerative amount of the second electric motor MG2 as much as possible during regenerative braking of the vehicle 8. A main portion of the control function will hereinafter be described with reference to FIG. 9.

Figure 9:
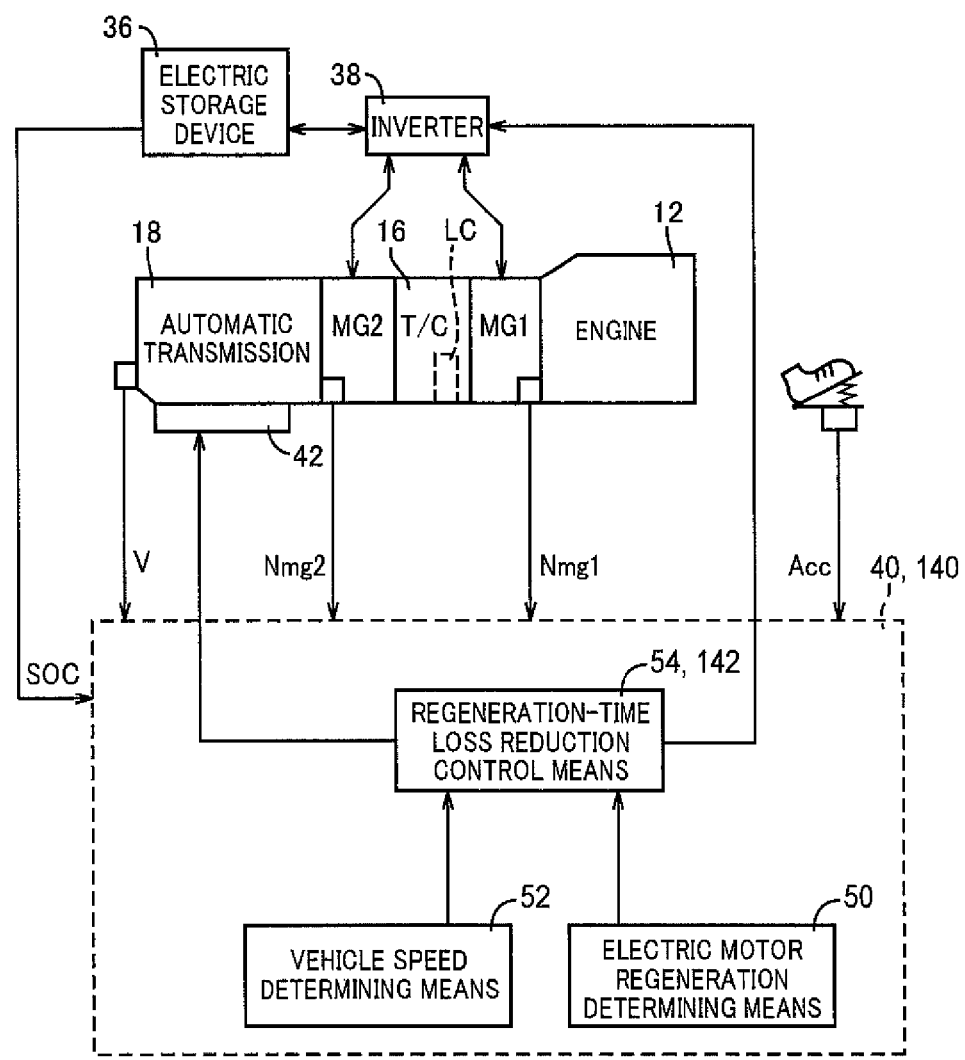
FIG. 9 is a functional block diagram for explaining a main portion of the control function included in the electronic control device of FIG. 3.

FIG. 9 is a functional block diagram for explaining a main portion of the control function included in the electronic control device 40 of this example. As depicted in FIG. 9, the electronic control device 40 includes an electric motor regeneration determining means 50 as an electric motor regeneration determining portion, a vehicle speed determining means 52 as a vehicle speed determining portion, and a regeneration-time loss reduction control means 54 as a regeneration-time loss reduction control portion.

The electric motor regeneration determining means 50 determines whether the second electric motor MG2 is during regeneration for performing the regenerative braking of the vehicle 8. When the second electric motor MG2 is during regeneration, the second electric motor MG2 performs the regenerative operation or is already performing the regenerative operation. For example, the electric motor regeneration determining means 50 determines whether the second electric motor MG2 is during regeneration, from a situation of a command related to drive of the second electric motor MG2. For example, if the brake pedal is depressed during vehicle running, the electronic control device 40 performs the regenerative operation of the vehicle 8 and, if the regenerative operation of the vehicle 8 is performed, the electronic control device 40 puts the engine 12 into the non-operating state and regeneratively operates the second electric motor MG2.

The vehicle speed determining means 52 sequentially detects the vehicle speed V with a vehicle speed sensor and determines whether the vehicle speed V is less than a predetermined first vehicle speed determination value V1. The vehicle speed determining means 52 also determines whether the vehicle speed V is less than a predetermined second vehicle speed determination value V2. The first vehicle speed determination value V1 and the second vehicle speed determination value V2 are preliminarily empirically defined such that if regeneration-time lockup control and regeneration-time engine rotation suppression control described later are provided based on the vehicle speed V when the regenerative braking of the vehicle 8 is performed, a braking torque applied from the pump impeller 16p to the turbine impeller 16t is minimized depending on the rotation speed difference between the pump impeller 16p and the turbine impeller 16t and a rotation resistance of the engine 12 in the regeneration-time lockup control and the regeneration-time engine rotation suppression control. In short, the first vehicle speed determination value V1 and the second vehicle speed determination value V2 are preliminarily empirically defined such that the regeneration-time loss torque TGlss depicted in FIG. 4 is minimized in the regeneration-time lockup control and the regeneration-time engine rotation suppression control. Minimizing the braking torque applied from the pump impeller 16p to the turbine impeller 16t, i.e., the regeneration-time loss torque TGlss depicted in FIG. 4, means reducing the torque as small as possible. Therefore, the first vehicle speed determination value V1 is the vehicle speed V corresponding to the turbine rotation speed Nt1 indicated by the point PTbc of FIG. 8 and the second vehicle speed determination value V2 is the vehicle speed V corresponding to the turbine rotation speed Nt2 indicated by the point PTab of FIG. 8. Since the turbine rotation speeds Nt1 and Nt2 depicted in FIG. 8 vary depending on the requested regenerative power and a relationship between the turbine rotation speed Nt and the vehicle speed V varies depending on the shift stage (gear ratio $\gamma_{AT}$) of the automatic transmission 18, the first vehicle speed determination value V1 and the second vehicle speed determination value V2 are preliminarily empirically obtained depending on the requested regenerative power for each shift stage of the automatic transmission 18 and are stored as a vehicle speed determination value map. An example of the vehicle speed determination value map is depicted in FIG. 10. As can be seen from a magnitude relation between the turbine rotation speeds Nt1 and Nt2 depicted in FIG. 8, the second vehicle speed determination value V2 corresponding to the turbine rotation speed Nt2 has a value always lower than the first vehicle speed determination value V1 corresponding to the turbine rotation speed Nt1. To compare the vehicle speed V with the first vehicle speed determination value V1 and the second vehicle speed determination value V2, the vehicle speed determining means 52 determines the first vehicle speed determination value V1 and the second vehicle speed determination value V2 from the vehicle speed determination value map of FIG. 10 before the comparison based on the shift stage of the automatic transmission 18 selected when the regenerative braking of the vehicle 8 is performed and the requested regenerative power at this point. After the first vehicle speed determination value V1 is determined, the vehicle speed determining means 52 determines whether the vehicle speed V is less than the first vehicle speed determination value V1. After the second vehicle speed determination value V2 is determined, the vehicle speed determining means 52 determines whether the vehicle speed V is less than the second vehicle speed determination value V2.

If the regenerative braking of the vehicle 8 is performed through the regenerative operation of the second electric motor MG2, the regeneration-time loss reduction control means 54 provides the regeneration-time lockup control of making an engagement force of the lockup clutch LC larger when a vehicle speed related value Vre varying depending on the vehicle speed V is higher. Making the engagement force of the lockup clutch LC larger means making a lockup clutch engagement oil pressure engaging the lockup clutch LC larger, for example. The vehicle speed related value Vre is not particularly limited as long as the value is a physical quantity corresponding to the vehicle speed V and becoming larger or higher when the vehicle speed V is higher, and corresponds to the vehicle speed V itself, the turbine rotation speed Nt, and the rotation speed Nout of the output gear 22, for example. In this example, the vehicle speed related value Vre is the vehicle speed V. The case of performing the regenerative braking of the vehicle 8 through the regenerative operation of the second electric motor MG2 specifically means that the electric motor regeneration determining means 50 determines that the second electric motor MG2 is during regeneration for performing the regenerative braking of the vehicle 8. Therefore, the regeneration-time loss reduction control means 54 provides the regeneration-time lockup control if the electric motor regeneration determining means 50 determines that the second electric motor MG2 is during regeneration. In the regeneration-time lockup control, since the regeneration-time loss reduction control means 54 makes the engagement force of the lockup clutch LC larger when the vehicle speed V is higher and the pump impeller 16p more hardly slips relative to the turbine impeller 16t when the engagement force of the lockup clutch LC becomes larger, providing the regeneration-time lockup control means bringing the pump rotation speed Np closer to the turbine rotation speed Nt when the vehicle speed V (vehicle speed related value Vre) is higher. For example, bringing the pump rotation speed Np closer to the turbine rotation speed Nt means bringing the rotation speed difference between the pump impeller 16p and the turbine impeller 16t closer to zero or bringing the speed ratio (=Np/Nt) of the torque converter 16 closer to one.

Specifically, the regeneration-time loss reduction control means 54 changes the engagement force of the lockup clutch LC stepwise based on the vehicle speed V in the regeneration-time lockup control. In particular, when the regenerative braking of the vehicle 8 is performed, i.e., when the electric motor regeneration determining means 50 determines that the second electric motor MG2 is during regeneration, if the vehicle speed V is equal to or greater than the first vehicle speed determination value V1, the regeneration-time loss reduction control means 54 engages the lockup clutch LC. On the other hand, if the vehicle speed V is less than the first vehicle speed determination value V1, the regeneration-time loss reduction control means 54 releases the lockup clutch LC. Whether the vehicle speed V is equal to or greater than the first vehicle speed determination value V1 and whether the vehicle speed V is less than the first vehicle speed determination value V1 are based on a determination of the vehicle speed determining means 52. If the lockup clutch LC is engaged, the rotation speed difference between the pump impeller 16p and the turbine impeller 16t becomes zero.

During release of the lockup clutch LC when the regenerative braking of the vehicle 8 is performed through the regenerative operation of the second electric motor MG2, the regeneration-time loss reduction control means 54 provides the regeneration-time engine rotation suppression control of making the engine rotation speed Ne lower with the first electric motor MG1 when the vehicle speed related value Vre is lower, or specifically, when the vehicle speed V is lower. The regeneration-time loss reduction control means 54 engages the lockup clutch LC if the vehicle speed V is equal to or greater than the first vehicle speed determination value V1 in the regeneration-time lockup control and, therefore, provides the regeneration-time engine rotation suppression control on the condition that the vehicle speed V is less than the first vehicle speed determination value V1.

Specifically, the regeneration-time loss reduction control means 54 changes the engine rotation speed Ne stepwise with the first electric motor MG1 based on the vehicle speed V in the regeneration-time engine rotation suppression control. In particular, when the regenerative braking of the vehicle 8 is performed, i.e., when the electric motor regeneration determining means 50 determines that the second electric motor MG2 is during regeneration, if the vehicle speed V is less than the second vehicle speed determination value V2, the regeneration-time loss reduction control means 54 stops the rotation of the engine 12 with the first electric motor MG1. On the other hand, if the vehicle speed V is equal to or greater than the second vehicle speed determination value V2, the regeneration-time loss reduction control means 54 allows the engine 12 to rotate and remain in the non-operating state. Whether the vehicle speed V is equal to or greater than the second vehicle speed determination value V2 and whether the vehicle speed V is less than the second vehicle speed determination value V2 are based on the determination of the vehicle speed determining means 52. To stop the rotation of the engine 12 with the first electric motor MG1, for example, the regeneration-time loss reduction control means 54 controls the first electric motor MG1 to output torque in a direction of preventing the engine 12 from being dragged and rotated by the rotation of the turbine impeller 16t.

Both the regeneration-time lockup control and the regeneration-time engine rotation suppression control provided by the regeneration-time loss reduction control means 54 as described above reduce the regeneration-time loss torque TGlss (see FIG. 4) to increase the regenerative amount during the regenerative braking of the vehicle 8 and, therefore, the both controls may collectively be referred to as regeneration-time loss reduction control.

FIG. 11 is a flowchart for explaining a main portion of a control operation of the electronic control device 40, i.e., a control operation of providing the regeneration-time lockup control and the regeneration-time engine rotation suppression control depending on the vehicle speed V when the regenerative braking of the vehicle 8 is performed, and is repeatedly executed with an extremely short cycle time, for example, on the order of a few msec to a few tens of msec. The control operation depicted in FIG. 11 is performed solely or concurrently with another control operation.

First, at step (hereinafter, "step" will be omitted) SA1, it is determined whether the second electric motor MG2 is during regeneration for performing the regenerative braking of the vehicle 8. During regeneration of the second electric motor MG2, the engine 12 is put into the non-operating state. If the determination of SA1 is affirmative, i.e., if the second electric motor MG2 is during regeneration, the operation goes to SA2. On the other hand, if the determination of SA1 is negative, this flowchart is terminated. SA1 corresponds to the electric motor regeneration determining means 50.

At SA2 corresponding to the vehicle speed determining means 52, the first vehicle speed determination value V1 is determined from the vehicle speed determination value map of FIG. 10 based on the selected shift stage (current shift stage) of the automatic transmission 18 and the requested regenerative power. The requested regenerative power is determined within a range equal to or less than an upper limit value set for the requested regenerative power from the preliminarily empirically defined relationship based on the vehicle speed V and the depressing force and the depressing amount of the brake pedal. After the first vehicle speed determination value V1 is determined, it is determined whether the vehicle speed V is less than the first vehicle speed determination value V1. If the determination of SA2 is affirmative, i.e., if the vehicle speed V is less than the first vehicle speed determination value V1, the operation goes to SA3. On the other hand, if the determination of SA2 is negative, the operation goes to SA4.

At SA3 corresponding to the regeneration-time loss reduction control means 54, the lockup clutch LC is released. In other words, the lockup clutch LC is put into the lockup-off (lockup OFF). SA3 is followed by SA5.

At SA4 corresponding to the regeneration-time loss reduction control means 54, the lockup clutch LC is engaged. In other words, the lockup clutch LC is put into the lockup-on (lockup ON). Although only the second electric motor MG2 is basically regeneratively operated rather than the first electric motor MG1 in the regenerative braking of the vehicle 8, if the lockup clutch LC is put into the lockup-on at SA4, the first electric motor MG1 is coupled to the drive wheels 26 equally with the second electric motor MG2 and, therefore, the first electric motor MG1 may regeneratively be operated in addition to the second electric motor MG2. In other words, the electronic control device 40 may regeneratively operate both the first electric motor MG1 and the second electric motor MG2 during engagement of the lockup clutch LC when the regenerative braking of the vehicle 8 is performed.

At SA5 corresponding to the vehicle speed determining means 52, the second vehicle speed determination value V2 is determined from the vehicle speed determination value map of FIG. 10 based on the selected shift stage of the automatic transmission 18 and the requested regenerative power. After the second vehicle speed determination value V2 is determined, it is determined whether the vehicle speed V is less than the second vehicle speed determination value V2. If the determination of SA5 is affirmative, i.e., if the vehicle speed V is less than the second vehicle speed determination value V2, the operation goes to SA6. On the other hand, if the determination of SA5 is negative, the operation goes to SA7.

At SA6 corresponding to the regeneration-time loss reduction control means 54, the rotation of the engine 12 is actively stopped by the first electric motor MG1. The engine 12 is in the non-operating state during regenerative braking of the vehicle 8.

At SA7 corresponding to the regeneration-time loss reduction control means 54, the engine 12 is allowed to rotate and remain in the non-operating state. Therefore, the engine 12 and the pump impeller 16p are dragged and rotated by the rotation of the turbine impeller 16t.

This example has the following effects (A1) to (A8). (A1) According to this example, if the regenerative braking of the vehicle 8 is performed through the regenerative operation of the second electric motor MG2, the engine 12 is put into the non-operating state. The regeneration-time loss reduction control means 54 provides the regeneration-time lockup control of making the engagement force of the lockup clutch LC larger when the vehicle speed related value Vre is higher. Therefore, during regeneration of the second electric motor MG2, when the vehicle speed related value Vre is higher, i.e., when the vehicle speed V is higher, the torque loss of the torque converter 16 is considered more important than the rotation resistance of the engine 12 and the input/output rotation speed difference (=Nt−Np) of the torque converter 16 is reduced by the engagement force of the lockup clutch LC. Therefore, a regenerative loss of the second electric motor MG2 is reduced with consideration given to both the engine rotation resistance and the torque loss of the torque converter 16. Thus, the regenerative amount (e.g., in kWh) of the second electric motor MG2 can be increased during regeneration of the second electric motor MG2 as compared to the case of keeping the lockup clutch LC released regardless of the vehicle speed V, for example. If the regenerative amount can be increased in this way, the fuel efficiency can consequently be improved.

(A2) According to this example, if the regenerative braking of the vehicle 8 is performed through the regenerative operation of the second electric motor MG2, the regeneration-time loss reduction control means 54 brings the pump rotation speed Np closer to the turbine rotation speed Nt when the vehicle speed V (vehicle speed related value Vre) is higher in the regeneration-time lockup control. Therefore, the regenerative loss of the second electric motor MG2 is reduced with consideration given to both the engine rotation resistance and the torque loss of the torque converter 16 and, thus, the regenerative amount of the second electric motor MG2 can be increased during regeneration of the second electric motor MG2 as compared to the case that the engine 12 is dragged and passively rotated by the rotation of the turbine impeller 16t regardless of the vehicle speed V, for example.

(A3) According to this example, during release of the lockup clutch LC when the regenerative braking of the vehicle 8 is performed through the regenerative operation of the second electric motor MG2, the regeneration-time loss reduction control means 54 provides the regeneration-time engine rotation suppression control of making the engine rotation speed Ne lower with the first electric motor MG1 when the vehicle speed related value Vre is lower, or specifically, when the vehicle speed V is lower. As a result, during regeneration of the second electric motor MG2, when the vehicle speed V is lower, the rotation resistance of the engine 12 is considered more important than the torque loss of the torque converter 16 and the engine rotation speed Ne is reduced. Therefore, in the lower vehicle speed range in which the regenerative loss of the second electric motor MG2 cannot be reduced by the engagement force of the lockup clutch, the regenerative loss of the second electric motor MG2 is reduced with consideration given to both the rotation resistance of the engine 12 and the torque loss of the torque converter 16. Thus, the regenerative amount of the second electric motor MG2 can be increased during regeneration of the second electric motor MG2 as compared to the case that the engine 12 is dragged and passively rotated by the rotation of the turbine impeller 16t of the torque converter 16 regardless of the vehicle speed V, for example.

(A4) According to this example, if the regenerative braking of the vehicle 8 is performed through the regenerative operation of the second electric motor MG2, the regeneration-time loss reduction control means 54 provides the regeneration-time lockup control and the regeneration-time engine rotation suppression control depending on the vehicle speed V. Specifically, in the regeneration-time lockup control, if the vehicle speed V is equal to or greater than the first vehicle speed determination value V1, the lockup clutch LC is engaged, while if the vehicle speed V is less than the first vehicle speed determination value V1, the lockup clutch LC is released. In the regeneration-time engine rotation suppression control, if the vehicle speed V is less than the second vehicle speed determination value V2 (<V1), the rotation of the engine 12 is stopped by the first electric motor MG1, while if the vehicle speed V is equal to or greater than the second vehicle speed determination value V2, the engine 12 is allowed to rotate and remain in the non-operating state. Therefore, by using the first vehicle speed determination value V1 and the second vehicle speed determination V1 value V2, the regenerative loss of the second electric motor MG2 is reduced through simple control with consideration given to both the rotation resistance of the engine 12 and the torque loss of the torque converter 16. Therefore, a control load of the electronic control device 40 can be alleviated.

(A5) According to this example, the first vehicle speed determination value V1 and the second vehicle speed determination value V2 used in the determination of the vehicle speed determining means 52 are preliminarily empirically defined such that if the regeneration-time lockup control and the regeneration-time engine rotation suppression control are provided based on the vehicle speed V when the regenerative braking of the vehicle 8 is performed, the braking torque applied from the pump impeller 16p to the turbine impeller 16t is minimized depending on the rotation speed difference between the pump impeller 16p and the turbine impeller 16t and the rotation resistance of the engine 12. In other words, the values V1 and V2 are preliminarily empirically defined such that the braking torque is reduced as small as possible. Therefore, a sufficiently larger regenerative amount of the second electric motor MG2 can be acquired in a wide vehicle speed range with consideration given to both the rotation resistance of the engine 12 and the torque loss of the torque converter 16.

(A6) According to this example, the electronic control device 40 may regeneratively operate both the first electric motor MG1 and the second electric motor MG2 during engagement of the lockup clutch LC if the regenerative braking of the vehicle 8 is performed. As a result, since the torque during regeneration is distributed to the first electric motor MG1 and the second electric motor MG2, an overall copper loss of the electric motors MG1 and MG2 involved with the regeneration is reduced as compared to when only the second electric motor MG2 is regeneratively operated. Therefore, regenerative efficiency is improved in the vehicle 8 as a whole. The regenerative efficiency is a rate of a regenerative power (e.g., in kW) generated based on a braking power for regeneration (e.g., in kW) transmitted from the drive wheels 26 to the turbine impeller 16t during the regeneration braking of the vehicle 8, relative to the braking power for regeneration (=regenerative power/braking power for regeneration). Since the second electric motor MG2 is controlled such that the braking power for regeneration matches the requested regenerative power, the regenerative efficiency may be defined as a rate of the regenerative power to the requested regenerative power (=regenerative power/requested regenerative power).

(A7) According to this example, the vehicle speed determining means 52 determines the first vehicle speed determination value V1 and the second vehicle speed determination value V2 from the vehicle speed determination value map of FIG. 10 based on the shift stage of the automatic transmission 18 selected when the regenerative braking of the vehicle 8 is performed. Therefore, the first vehicle speed determination value V1 and the second vehicle speed determination value V2 can be determined suitably for each shift stage of the automatic transmission 18 with consideration given to the case that the automatic transmission 18 is shifted.

(A8) According to this example, the vehicle speed related value Vre may be the vehicle speed V or the turbine rotation speed Nt and, in this case, since both the vehicle speed V and the turbine rotation speed Nt can easily be detected by a sensor etc., the electronic control device 40 can easily acquire the vehicle speed related value Vre.

Another example of the present invention will be described. In the following description, the portions mutually common to the examples are denoted by the same reference numerals and will not be described.

Second Example

In this example (second example), the electronic control device 40 of the first example is replaced with an electronic control device 140. Although the automatic transmission 18 is not shifted for increasing the regenerative efficiency during the regenerative braking of the vehicle 8 in the first example, the automatic transmission 18 may be shifted for increasing the regenerative efficiency in this example. A difference of this example from the first example will hereinafter be described. A functional block diagram of this example is FIG. 9 as is the case with the first example.

As depicted in FIG. 9, the electronic control device 140 is the same as the electronic control device 40 of the first example in that the electric motor regeneration determining means 50 and the vehicle speed determining means 52 are included, and is different from the electronic control device 40 of the first example in that a regeneration-time loss reduction control means 142 is included in place of the regeneration-time loss reduction control means 54.

Figure 12:
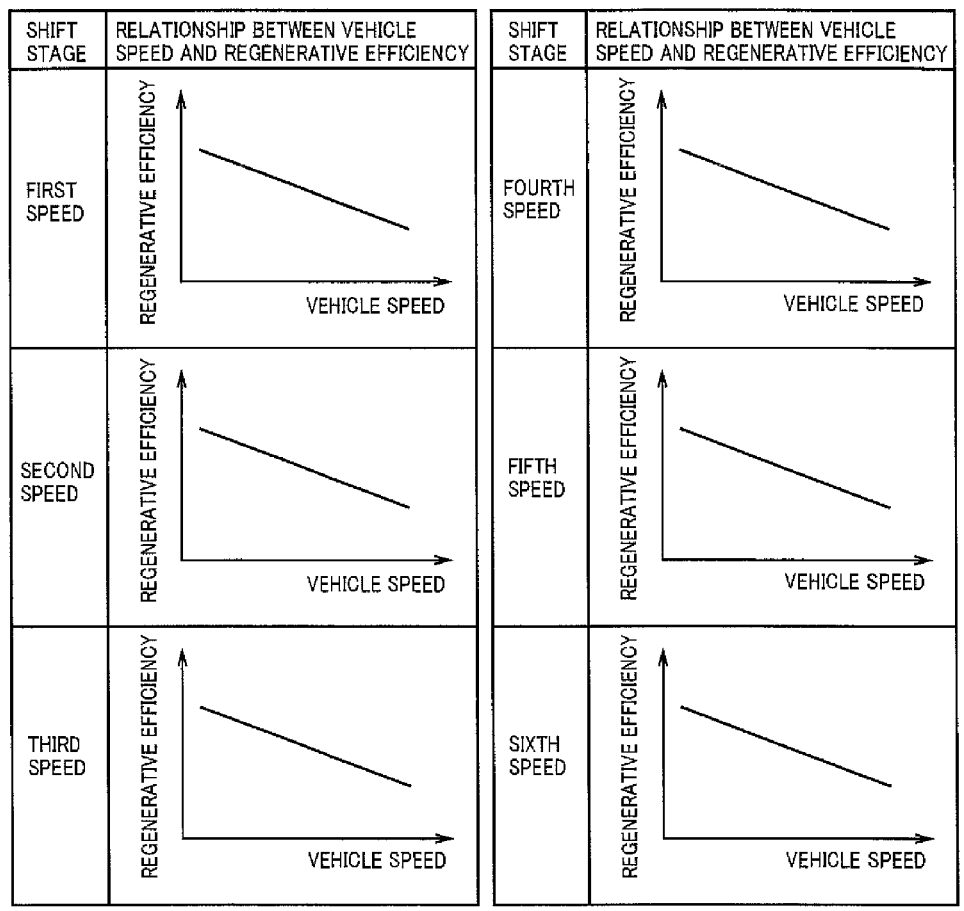
FIG. 12 is an example of the regenerative efficiency map representative of a relationship between the regenerative efficiency and the vehicle speed for each shift stage of the automatic transmission at a certain requested regenerative power used during regenerative braking of the hybrid vehicle in FIG. 1.

The regeneration-time loss reduction control means 142 provides the regeneration-time lockup control and the regeneration-time engine rotation suppression control as is the case with the regeneration-time loss reduction control means 54 of the first example. Additionally, if the regenerative braking of the vehicle 8 is performed through the regenerative operation of the second electric motor MG2, the regeneration-time loss reduction control means 142 provides regeneration-time shift control of selecting the shift stage of the automatic transmission 18 based on the requested regenerative power and the vehicle speed V so as to increase the regenerative efficiency of the second electric motor MG2. For example, on the assumption that the regeneration-time lockup control and the regeneration-time engine rotation suppression control are provided in accordance with the first vehicle speed determination value V1 and the second vehicle speed determination value V2, a relationship between the regenerative efficiency and the vehicle speed V is preliminarily empirically obtained for each level of the requested regenerative power and stored in advance in the regeneration-time loss reduction control means 142 as in a regenerative efficiency map of FIG. 12. The regeneration-time loss reduction control means 142 selects the shift stage of the automatic transmission 18 achieving the highest regenerative efficiency from the regenerative efficiency map based on the requested regenerative power and the vehicle speed V in the regeneration-time shift control. The selected shift stage is established. In other words, the automatic transmission 18 is shifted to the selected shift stage. The regeneration-time loss reduction control means 142 may select the shift stage of the automatic transmission 18 based on the requested regenerative power and the vehicle speed V in the regeneration-time shift control such that the regenerative efficiency of the second electric motor MG2 is increased while the engine rotation speed Ne during the regenerative braking becomes higher. For example, in the regeneration-time shift control, the regeneration-time loss reduction control means 142 acquires the shift stage of the automatic transmission 18 achieving the highest regenerative efficiency from the regenerative efficiency map and concurrently determines from the regenerative efficiency map whether another shift stage exists that can achieve regenerative efficiency equivalent to the regenerative efficiency acquired at the shift stage, i.e., the highest regenerative efficiency. The regenerative efficiency equivalent to the highest regenerative efficiency is, for example, regenerative efficiency within a predetermined regenerative efficiency equivalent range that can be considered equivalent as compared to the highest regenerative efficiency. If the other shift stage exists as a result of the determination, the regeneration-time loss reduction control means 142 determines which shift stage achieves the highest engine rotation speed Ne during the regenerative braking between the shift stage achieving the highest regenerative efficiency and the other shift stage. Based on the determination, the shift stage achieving the highest engine rotation speed Ne during the regenerative braking is selected and the selected shift stage is established. As described above, the regeneration-time loss reduction control means 142 selects the shift stage of the automatic transmission 18 such that the engine rotation speed Ne during the regenerative braking becomes higher in the regeneration-time shift control. FIG. 12 exemplarily depicts a portion of the regenerative efficiency map representative of a relationship between the regenerative efficiency and the vehicle speed V for each shift stage of the automatic transmission 18 at a certain requested regenerative power.

Since the regeneration-time shift control is provided as described above, the regeneration-time loss reduction control means 142 provides the regeneration-time lockup control and regeneration-time engine rotation suppression control after a shift stage of the automatic transmission 18 is selected and established in the regeneration-time shift control on the assumption that the automatic transmission 18 is at the selected shift stage.

Figure 13:
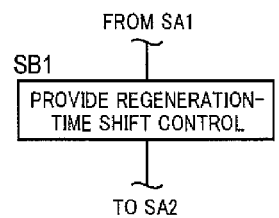
FIG. 13 is a diagram of a step added to the flowchart of FIG. 11 in a flowchart of the second example for explaining a main portion of the control operation of the electronic control device of FIG. 9.

FIG. 13 is a diagram of a step added to the flowchart of FIG. 11 in a flowchart for explaining a main portion of the control operation of the electronic control device 140 of this example. The flowchart of this example described with reference to FIG. 13 is acquired by inserting SB1 of FIG. 13 between SA1 and SA2 of FIG. 11 in the flowchart of FIG. 11.

In the flowchart of this example, if the determination of SA1 of FIG. 11 is affirmative, the operation goes to SB1 of FIG. 13. At SB1, the regeneration-time shift control is provided. In the regeneration-time shift control, the shift stage of the automatic transmission 18 is selected from the regenerative efficiency map based on the requested regenerative power and the vehicle speed V such that the regenerative efficiency of the second electric motor MG2 becomes higher. The selected shift stage is established. In the regeneration-time shift control, the shift stage of the automatic transmission 18 may be selected such that the regenerative efficiency of the second electric motor MG2 becomes higher and that the engine rotation speed Ne during the regenerative braking becomes higher. Since the first electric motor MG1 may regeneratively be operated in addition to the second electric motor MG2 during the engagement of the lockup clutch LC, the shift stage is preferably selected in the regeneration-time shift control in this case such that the regenerative efficiency becomes higher in the electric motors MG1 and MG2 as a whole. In this example, SA3, SA4, SA6, SA7 of FIG. 11, and SB1 of FIG. 13 correspond to the regeneration-time loss reduction control means 142. SB1 of FIG. 13 is followed by SA2 of FIG. 11.

This example has the following effect in addition to the effects (A1) to (A8) of the first example. In this example, if the regenerative braking of the vehicle 8 is performed through the regenerative operation of the second electric motor MG2, the regeneration-time loss reduction control means 142 provides the regeneration-time shift control and may select the shift stage of the automatic transmission 18 in the regeneration-time shift control such that the regenerative efficiency of the second electric motor MG2 becomes higher and that the engine rotation speed Ne during the regenerative braking becomes higher. In this case, since the higher engine rotation speed Ne results in better re-acceleration performance when an acceleration operation is performed during the regenerative braking of the vehicle 8, the favorable re-acceleration performance can easily be acquired while the regenerative efficiency of the second electric motor MG2 is made higher.

Although the examples of the present invention have been described in detail with reference to the drawings, these examples are merely an embodiment and the present invention can be implemented in variously modified and improved forms based on the knowledge of those skilled in the art.

For example, although the lockup clutch LC is released if the vehicle speed V is less than the first vehicle speed determination value V1 in the regeneration-time lockup control in the first example, the lockup clutch LC may not completely be released and may be slipped. If the vehicle speed V is less than the second vehicle speed determination value V2, the rotation of the engine 12 is stopped by the first electric motor MG1 in the regeneration-time engine rotation suppression control and, therefore, the lockup clutch LC is preferably completely released rather than being slipped. The slip of the lockup clutch LC in the regeneration-time lockup control is preferably implemented if the operating oil temperature of the automatic transmission 18 is equal to or greater than a predetermined value, so as to ensure responsiveness.

Although both the regeneration-time lockup control and the regeneration-time engine rotation suppression control are provided based on the vehicle speed V in the first and second examples, either one of the controls may never be provided.

Figure 14:
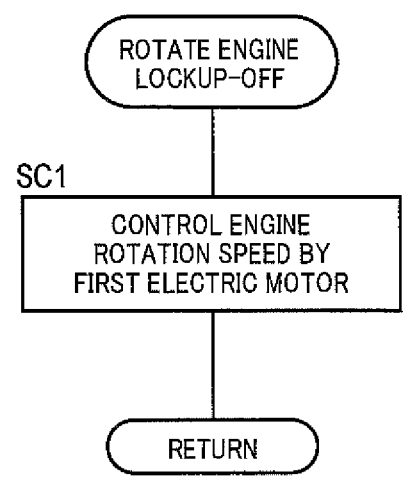
FIG. 14 is a flowchart for explaining a sub-routine, which may be performed at SA7 of FIG. 11.

Although the engine 12 is dragged and passively rotated by the rotation of the turbine impeller 16t at SA7 of FIG. 11 in the first and second examples, the engine rotation speed Ne may be controlled by the first electric motor MG1 such that the regenerative efficiency of the second electric motor MG2 becomes higher. In other words, during release of the lockup clutch LC when the regenerative braking of the vehicle 8 is performed, the regeneration-time loss reduction control means 54, 142 may control the engine rotation speed Ne with the first electric motor MG1 such that the regenerative efficiency of the second electric motor MG2 becomes higher. For example, to make the regenerative efficiency of the second electric motor MG2 higher, a sub-routine depicted in FIG. 14 is performed at SA7 described above. At SC1 of FIG. 14, a magnitude of a current (generated current) supplied to the electric storage device 36 through electric generation of the second electric motor MG2 is sequentially detected and the engine rotation speed Ne is adjusted by the first electric motor MG1 in a direction of increasing the generated current. As a result, during release of the lockup clutch LC, the regenerative amount of the second electric motor MG2 can actively be increased as compared to the case that the engine 12 is dragged and passively rotated by the rotation of the turbine impeller 16t, for example.

Although the automatic transmission 18 is a stepped transmission in the first and second examples, the automatic transmission 18 may be a continuously variable transmission (CVT) capable of continuously varying the gear ratio $\gamma_{AT}$. In the first example, the vehicle drive device 10 without the automatic transmission 18 is also conceivable.

Although the vehicle drive device 10 includes the first electric motor MG1 in the first and second examples, the first electric motor MG1 may not necessarily be essential.

Although the vehicle drive device 10 includes the torque converter 16 as a hydraulic power transmission device in the first and second examples, a fluid coupling may be disposed instead of the torque converter 16 unless a torque amplification effect is utilized in the form.

Although the first vehicle speed determination value V1 and the second vehicle speed determination value V2 are parameters set depending on the requested regenerative power as depicted in FIG. 10 in the first and second examples, the values V1 and V2 may be set depending on a charge limitation limiting a charge power to the electric storage device 36, for example. In this case, the requested regenerative power is determined based on the charge limitation and the first vehicle speed determination value V1 and the second vehicle speed determination value V2 are determined from the vehicle speed determination value map of FIG. 10 based on the requested regenerative power corresponding to the charge limitation. The charge limitation of the electric storage device 36 is determined based on the charge remaining amount SOC of the electric storage device 36 and the temperature of the electric storage device 36, for example. When the charge limitation is increased, an upper limit value of the charge power to the electric storage device 36 is decreased and, therefore, when the charge remaining amount SOC is larger or when the temperature of the electric storage device 36 is lower, the upper limit value of the charge power is set lower.

Although the rotation of the engine 12 is actively stopped by the first electric motor MG1 at SA6 of FIG. 11 in the first and second examples, if the first electric motor MG1 is continuously in a state in which an absolute value of the torque of the first electric motor MG1 is equal to or greater than a predetermined value for a predetermined time or longer, the electronic control device 40, 140 may temporarily reduce the absolute value of the torque of the first electric motor MG1 so as to prevent a rise in temperatures of the first electric motor MG1 and the inverter 38.

Although the first electric motor MG1 is directly coupled to the pump impeller 16p of the torque converter 16 as depicted in FIG. 1 in the first and second examples, the first electric motor MG1 may indirectly be coupled to the pump impeller 16p via a transmission, a clutch, an electric belt or the like. The same applies to the relationship between the second electric motor MG2 and the turbine impeller 16t.

In the first and second examples, the vehicle drive device 10 is not limited to those used in FF (front-engine front-drive) type vehicles and may be those used in vehicles of other drive types.

Although the vertical axis of FIG. 8 is the second electric motor regenerative power PGmg2 in the first and second examples, the second electric motor regenerative power PGmg2 may be replaced with the second electric motor regenerative torque TGmg2 (see FIG. 4). In other words, if a replacement is made in FIG. 8 from the precondition that the requested regenerative power is constant to the precondition that the requested regenerative torque TG* (see FIG. 4) is constant, a relationship between the second electric motor regenerative torque TGmg2 replacing the second electric motor regenerative power PGmg2 and the turbine rotation speed Nt has the same tendency as the relationship between the second electric motor regenerative power PGmg2 and the turbine rotation speed Nt depicted in FIG. 8.

If the regenerative braking of the vehicle 8 is performed through the regenerative operation of the second electric motor MG2 in the first example, the regeneration-time lockup control is provided that makes the engagement force of the lockup clutch LC larger when the vehicle speed related value Vre is higher, and whether the regeneration-time lockup control is provided in a typical hybrid vehicle can be confirmed with various methods. For example, in the case of a hybrid vehicle having a sequential shift mode enabling continuous running at a fixed shift stage of the automatic transmission 18, a sequential shift may be set around the third speed after acceleration to a sufficiently high vehicle speed V and the brake pedal may then be depressed to a level causing the wheel brake device to operate along with the regenerative operation of the second electric motor MG2 so as to monitor a relationship between the vehicle speed V and the engagement force of the lockup clutch LC during deceleration of the vehicle.

The examples described above may be implemented in a mutually combined manner by setting priorities, for example.

NOMENCLATURE OF ELEMENTS

8: vehicle 10: vehicle drive device 12: engine 16: torque converter (hydraulic power transmission device) 16p: pump impeller (input-side rotating member) 16t: turbine impeller (output-side rotating member) 18: automatic transmission (mechanical transmission) 40, 140: electronic control device (control device) 26: drive wheels LC: lockup clutch MG1: first electric motor (engine-coupled electric motor) MG2: second electric motor (electric motor)

The invention claimed is:

1. A control device of a vehicle drive device for use with a vehicle having an engine and drive wheels, the control device comprising:
    a hydraulic power transmission device having a lockup clutch mechanically coupling: an input-side rotating member to which power from the engine is input, and an output-side rotating member outputting power to the drive wheels;
    an electric motor coupled to a power transmission path between the hydraulic power transmission device and the drive wheels; and
    an engagement force of the lockup clutch is increased in response to: (i) regeneration braking of a vehicle being performed with the electric motor and (ii) a vehicle speed related value varying depending on a vehicle speed is higher than a first predetermined vehicle speed determination value,
    an engine coupled electric motor is disposed that is coupled to a power transmission path between the engine and the hydraulic power transmission device, wherein the engine-coupled electric motor is configured to be regeneratively operated along with the electric motor, and
    during release of the lockup clutch when the regeneration braking of the vehicle is performed, a rotation speed of the engine is made lower by the engine-coupled electric motor when the vehicle speed related value is lower than a second predetermined vehicle speed determination value.

2. The control device of a vehicle drive device of claim 1, wherein if the regeneration braking of the vehicle is performed, a rotation speed of the input side rotating member of the hydraulic power transmission device is brought closer to a rotation speed of the output side rotating member when the vehicle speed related value is higher than the first predetermined vehicle speed determination value.

3. The control device of a vehicle drive device of claim 1, wherein during engagement of the lockup clutch when the regeneration braking of the vehicle is performed, both the electric motor and the engine-coupled electric motor are regeneratively operated.

4. The control device of a vehicle drive device of claim 1, wherein during release of the lockup clutch when the regeneration braking of the vehicle is performed, the rotation speed of the engine is controlled by the engine-coupled electric motor such that the regenerative efficiency of the electric motor increases.

5. The control device of a vehicle drive device of claim 1, wherein the vehicle speed related value is a vehicle speed or a rotation speed of the output-side rotating member.

6. The control device of a vehicle drive device of claim 1, wherein:
    if the regeneration braking of the vehicle is performed, the lockup clutch is engaged when the vehicle speed is equal to or greater than a first vehicle speed determination value,
    the lockup clutch is released or slipped when the vehicle speed is less than the first vehicle speed determination value, and
    rotation of the engine is stopped by the engine-coupled electric motor when the vehicle speed is less than a second vehicle speed determination value lower than the first vehicle speed determination value.

7. The control device of a vehicle drive device of claim 6, wherein the first vehicle speed determination value and the second vehicle speed determination value are preliminarily defined to minimize a braking torque applied from the input-side rotating member to the output-side rotating member depending on a rotation speed difference between the input-side rotating member and the output-side rotating member and a rotation resistance of the engine when the regeneration braking of the vehicle is performed.

8. The control device of a vehicle drive device of claim 6, wherein
    a mechanical transmission is disposed in a power transmission path between the electric motor and the drive wheels, and
    the first vehicle speed determination value and the second vehicle speed determination value are defined based on a shift stage of the mechanical transmission selected when the regeneration braking of the vehicle is performed.

9. The control device of a vehicle drive device of claim 8, wherein the shift stage of the mechanical transmission is selected such that a regenerative efficiency of the electric motor increases and that the rotation speed of the engine increases, when the regeneration braking of the vehicle is performed.

* * * * *